INVENTORS
ELVIN C. WELCH
RICHARD V. SPANNAGEL

Elliott & Pastoriza
ATTORNEYS

United States Patent Office 3,359,474
Patented Dec. 19, 1967

3,359,474
STEPPER MOTOR CONTROL AND STEP DETECTOR
Elvin C. Welch, Culver City, and Richard V. Spannagel, Inglewood, Calif., assignors, by mesne assignments, to International Telephone and Telegraph Corporation, New York, N.Y., a corporation of Maryland
Filed Nov. 27, 1964, Ser. No. 414,360
3 Claims. (Cl. 318—138)

ABSTRACT OF THE DISCLOSURE

This disclosure relates to a step detector for a stepper motor in which a rotor is caused to step through discrete angles in response to input pulses a specific step being executed for each pulse received. The step detector itself provides a signal only when the rotor of the stepper motor has stepped to a new position in response to an input pulse. This signal in turn is passed to an enabling means which functions to only pass the next input pulse to step the rotor when the signal passed by the detecting means is present thus indicating that the rotor has been stepped to its previous position. Otherwise, the enabling means blocks successive pulses to the stepper motor. As a result, assurance is provided that the stepper motor will step in response to each and every pulse received in the control means effecting the stepping. Any failure of the stepper motor to step results in the enabling means blocking successive pulses.

---

Figures 1, 2:
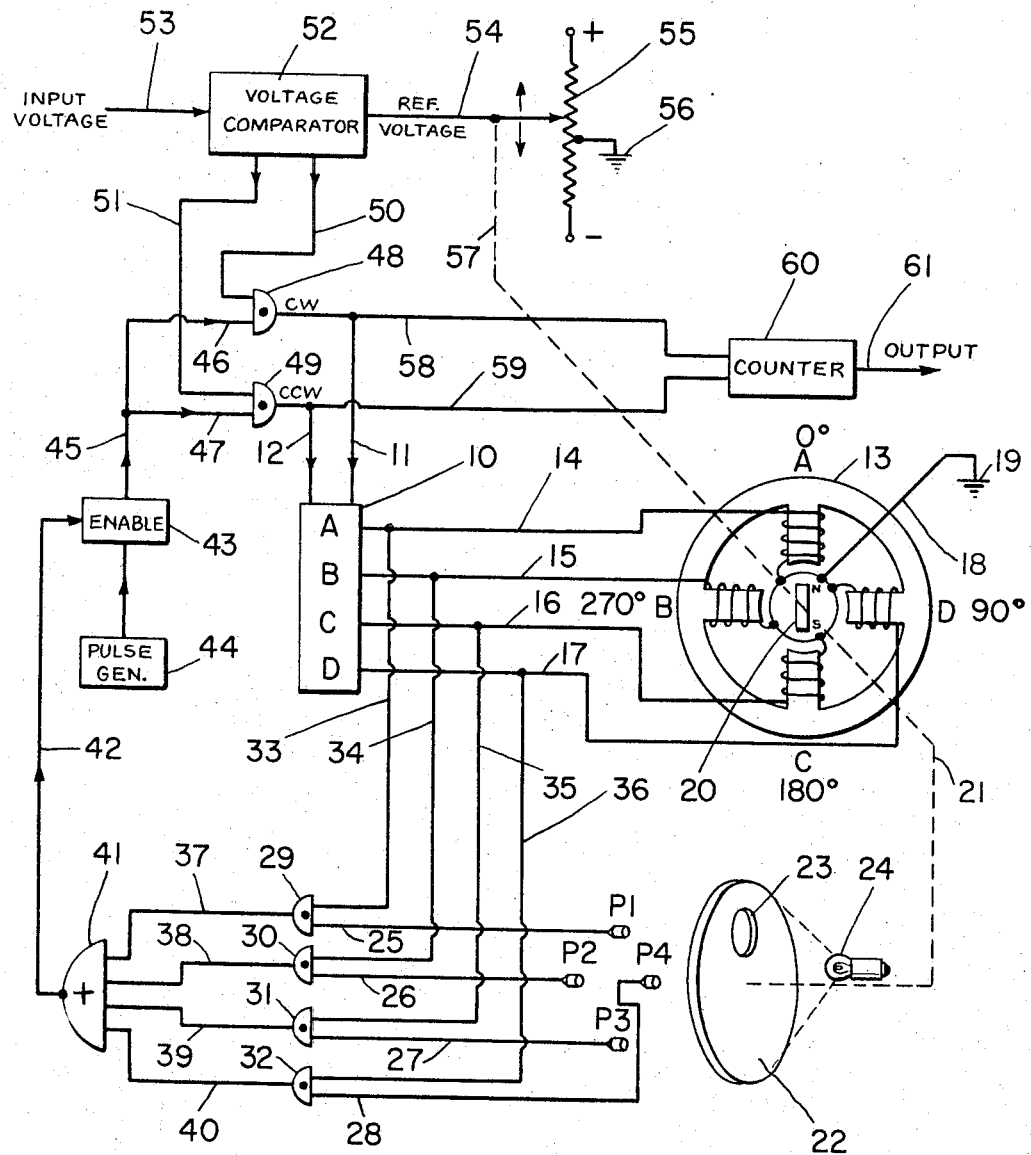

This invention relates generally to stepper motors and more patricularly to a novel stepper motor circuit incorperating step detecting means for vertifying the position of the output rotor shaft of the motor.

Conventional stepper motors usually take the form of a digitally actuated bi-directional motor. Stepping of the motor is effected by a control means often referred to as a step-servo controller. Each time an input pulse of electrical energy is applied to a clockwise input terminal of the controller, the controller switches the energized state of the motor windings 90 degrees in a clockwise direction. The rotor of the stepper motor is a permanent magnet and therefore it follows the 90-degree step of the energized windings. When a pulse is applied to the counterclockwise input terminal of the controller, the stepper motor will rotate 90 degrees in a counterclockwise direction.

In addition to 90-degree stepper motors, there may be provided motors capable of stepping through other discrete angles such as 45 degrees. Stepper motors of the type under consideration together with the controller circuits therefor, are shown and described in the co-pending patent application Serial No. 93,767 filed Mar. 6, 1961, Stepper Motor Circuits.

Permanent magnet stepper motors of the foregoing type have been run millions of cycles at rates in excess of 250 steps per second without missing a single step. However, there are instances as in large core memories of computers wherein it is important that pulse data is stored and retrieved with a high confidence level. It is therefore extremely important that when using a stepper motor, the position of the output shaft of the motor responds to each and every pulse that enters the controller. Should a pulse enter the controller and for some reason or other not effect a proper stepping of the rotor, the rotor stepping will fall one pulse behind the energizing pulses and as a consequence, the shaft position of the motor will not properly represent the pulse input information.

Failure of the stepper motor shaft to step in response to each and every pulse can result from two successive pulses being too close together. Thus the inertia of the rotor as well as other factors may prevent proper stepping of the rotor under excessive pulse rates. In addition, spurious pulses may occur as a result of power source switching tranisents or mechanical load transients resulting from imperfections in the mechanical components. Such transients may result in false stepping of the motor or may cause the motor to miss a step in response to an input pulse on the controller.

With the foregoing considerations in mind, it is accordingly a primary object of this invention to provide, in combination with a stepper motor and as an integral part thereof, if desired, step detecting means which will verify the position of the output rotor shaft of the motor to insure that the rotor has responded to each and every pulse entering the controller for the motor.

Another object of this invention is to provide an improved stepper motor in which application of pulses at excessive rates is not possible, to the end that the motor may be operated at its maximum speed and still respond to every pulse received, even when the direction is reversed.

Still another object of this invention is to provide an improved stepper motor in which the presence of transient pulses and the like will not affect the operation of the motor insofar as proper stepping of the rotor in response to each and every intended pulse is concerned.

Briefly, these and other objects and advantages of this invention are attained by providing a step detector means in combination with a stepper motor which is responsive to the physical stepping of the rotor shaft from a given position to a next successive position to generate a given signal. This given signal in turn is passed to an enabling circuit which is responsive to the given signal to permit a pulse to pass to the controller for the stepper motor. The step detector means is so designed that it will only provide the given signal to enable a next successive pulse to operate the motor if the rotor has actually physically been stepped as a consequence of the immediately preceding pulse. In the event that the rotor has not responded to the immediately preceding pulse, the step detector means will not provide the given signal to the enabling means and therefore the normally received next successive pulse to the motor will be blocked and further pulses will continue to be blocked until the rotor actually physically moves to its next successive position.

By means of the foregoing step detector arrangement, it is not possible for the rotor to fall out of synchronism with the input pulses applied to the controller for the motor and therefore the rotor will be stepped in response to each and every pulse permitted to be received in the controller by the enabling means.

A better understanding of the invention will be had by now referring to a preferred embodiment thereof as shown in the accompanying drawings, in which:

FIGURE 1 is a schematic circuit diagram partly in block form of the stepper motor and step detector of the invention as utilized in an analog to digital converter system; and FIGURE 2 is a table useful in describing the stepping operation of the motor illustrated in FIGURE 1.

Referring to the central portion of FIGURE 1 there is shown by the elongated vertical block a controller 10 having a clockwise pulse input line 11 and a counter-clockwise pulse input line 12. The stepper motor itself includes a stator 13 having field windings A, B, C, and D. In the particular motor set forth for illustrative purposes, the controller 10 is provided with four output lines 14, 15, 16, 17 connecting to these windings respectively. The inner ends of the windings connect to a common ring conductor passing through line 18 to ground at 19.

With the foregoing arrangement, it will be clear that when the line 14 from the controller 10 is energized to energize the coil A by passing current therethrough to the lead 18 and ground at 19, a magnetic field will be established in a vertical direction. Similarly, when the line 14 is de-energized and the line 15 from the controller energized to energize the coil B, the established magnetic field will be stepped 90 degrees in a counterclockwise direction. Subsequent successive energization of the output lines 16 and 17 will result in further stepping of the magnetic field as a consequence of energization successively of the coils C and D.

The motor also includes a permanent magnet rotor member 20 which will align itself with the particular direction of the established magnetic field. Thus, successive energization of the field windings A, B, C, and D will result in stepping of the rotor 20 through 90 degrees in a counterclockwise direction.

The controller 10 may be of the type described in detail in my heretofore referred to co-pending application and operates to successively energize its output lines and thus the coils to effect clockwise rotation of the rotor 20 when pulses are received on the input line 11 and counterclockwise rotation of the rotor 20 when pulses are received on the input line 12.

As indicated schematically by the dash line 21, the shaft of the rotor 20 is coupled to a shutter in the form of a disk 22 having an opening at 23. The disk 22 and opening 23 constitute a part of a step detecting means for detecting the rotor position in accordance with the present invention. In this respect, the single opening 23 is positioned to be in alignment with rotor 20 at all times and thus is shown in an "up" position in FIGURE 1.

The step detector also includes a light source 24 disposed on one side of disk 22 and a plurality of detecting means in the form of photo-cells P1, P2, P3, and P4. These photo-cells are circumferentially spaced at 90 degrees in positions corresponding to the positions of the various coils of the stepped motor. The positioning is such that the photo-cell P1 will be energized from the light source 24 only when the disk 22 is positioned so that its opening 23 is in alignment with the photo-cell P1. This position of the disk only occurs when the rotor 20 is in its "up" position as shown. When the rotor 20 rotates, for example, in a counterclockwise direction through 90 degrees, the opening 23 on the disk 22 will then be in a position such that the photo-cell P2 is energized by the light source 24. Photo-cells P3 and P4 are similarly energized by successive counterclockwise steps of the rotor 20 and disk 22.

The outputs from the respective photo-cells are indicated at 25, 26, 27 and 28 and pass to first inputs of a plurality of coincidence or "and" circuits 29, 30, 31, and 32, respectively. The second inputs to the "and" circuits are shown at 33, 34, 35 and 36 connected respectively to the outputs 14, 15, 16, and 17 of the controller 10.

The outputs from the coincidence circuits are indicated at 37, 38, 39, and 40 and all pass to a "or" type circuit designated by the block 41. The output line 42 from the "or" circuit 41 passes to an enabling means 43 which functions as a gate to pass or block pulses from a pulse generator 44 to an output line 45 and thence to lines 46 and 47 passing into first inputs of coincidence or "and" circuits 48 and 49, respectively. The outputs from these circuits connect to the pulse input lines 11 and 12 respectively. Second inputs to the coincidence circuits 48 and 49 are provided by leads 50 and 51 from a voltage comparator 52. The voltage comparator 52 functions to compare an analog input voltage 53 with a reference voltage derived from a tap 54 on a resistance 55. The resistance 55 is center-tapped to ground at 56 and is provided with a given voltage.

The foregoing portion of the analog to digital converter circuit is completed by output lines 58 and 59 from the coincidence circuits 48 and 49 passing to a counter 60 and thence to a digital output 61.

The coincidence circuits 48 and 49 and the voltage comparator 52 together with the counter 60 and their associated components are not properly part of the present invention but merely provide an illustration of the manner in which the stepper motor with the step detector may be employed.

With the foregoing description of the various components in mind, the operation of the entire system of FIGURE 1 will now be set forth.

As described fully in the aforementioned co-pending application, the controller 10 is responsive to clockwise pulses on its input lead 11 to sequentially step the magnetic field established by the coils A, D, C, and B and thus the rotor 20 in 90-degree increments. Thus, with reference to the left portion of the tabel shown in FIGURE 2, when coil A is energized the rotor will be in a zero degree position. When coil D is energized, the coil will rotate 90 degrees in a clockwise direction to the 90-degree position. When coil C is energized the rotor will rotate to the 180-degree position and when coil B is energized the rotor will rotate to the 270-degree position.

When counterclockwise rotation pulses are received on the line 12, the coils will be energized in the sequence A, B, C, and D so as to effect counterclockwise stepping of the rotor through discrete angles of 90 degrees. It should be understood, as brought out in the co-pending application, that the controller may be designed to energize both coils A and B simultaneously in which event the rotor 20 would align itself at 315 degrees. If next coils B and C are energized the rotor 20 would step through 90 degrees, and so forth. In such case the disc 22 would have two holes spaced at 90°, one hole corresponding to each coil energized. The particular example set forth when the coils are each individually energized is thus merely by way of example.

Assume first that a counterclockwise pulse is received on the input line 12 for the controller 10. In response to this pulse, the controller will de-energize coil A and energize coil B. As a consequence, the rotor 20 will rotate 90 degrees in a counterclockwise direction. This motion of the rotor 20 will also effect rotation of the disk 22 to move the opening 23 from its "up" position to a position 90 degrees therefrom in a counterclockwise direction. The photo-cell P1 will then be de-energized and the photo-cell P2 will be energized thereby providing an input signal on the coincidence circuit 30 through the line 26 and removing the input signal on the line 25 to the coincidence circuit 29. Also, when the coil A is de-energized and the coil B is energized, the signal on the line 15 will be passed through the lead 34 to the other input to the coincidence circuit 30.

Each of the coincidence circuits is designed so that it will only provide a given signal on its output when both of its inputs are energized. There will therefore be provided a given signal on the output line 38 for the coincidence circuit 30 which is passed by the "or" circuit 41 through the lead 42 to the enabling circuit 43. In the absence of any signal in the enabling circuit 43, subsequent pulses from the pulse generator 44 are blocked from the line 45. However, since the rotor 20 has actually physically stepped to its new position to energize the photo-cell P2 and thus provide a given signal on the output line 38, the next pulse provided by the pulse generator 44 will be passed through the line 45 to pulse the controller 10 through one or the other of the coincidence circuits 48 or 49.

Assume that the coincidence circuit 49 is energized so that the next pulse is then passed to the counterclockwise input line 12 to the controller 10. The coil B will then be de-energized and the coil C energized so that the rotor 20 will rotate another 90 degrees in a counterclockwise direction. This action again rotates disk 22 to bring opening 23 to its lower most position thereby energizing the photo-cell P3. The coincidence circuit 31 will thus have a signal on its input 27 and, since the winding C is energized, an input on the lead 35 extending from the output 16 of the controller. Therefore, a given signal will be provided at the output of the coincidence circuit 31 and pass through the "or" circuit 41, and lead 42 to the circuit 43.

Suppose now, by way of example, that the rotor 20 failed to step when the coil B was de-energized and the coil C was energized. In this event, the disk 22 would not have been rotated to move the opening 23 from the photocell P2 to the photo-cell P3. Therefore, only the input to the coincidence circuit 31 provided by the line 35 would be energized, the other input on line 27 having no signal appearing thereon. Therefore, no signal would be on the output 39 to pass through the "or" circuit 41 and lead 42 to the enabling circuit 43. The enabling circuit would therefore block the subsequent pulse from the pulse generator 44 and no further stepping of the magnetic field could occur until such time as the rotor 20 actually moved to its position properly in alignment with the magnetic field generated by the coil C.

From the description thus far, it will be evident that the stepping action of the motor is inhibited until such time that the rotor is properly aligned with the energized magnetic field. Accordingly, perfect synchronism is maintained between the steps and the pulses received.

Referring now to the operation of the upper portion of the circuit of FIGURE 1 wherein the stepper motor and the step detector are incorporated in an analog to digital converter circuit, assume that a positive input analog voltage exists on line 53. Assume also that the tap 54 is positioned as shown to provide a smaller but positive reference voltage.

The voltage comparator provides a difference voltage between the input and reference voltage which difference voltage is positive and will be passed on the line 50 to the second input of the coincidence circuit 48. When the input voltage is higher than the reference voltage there will be no signal on the line 51 from the voltage comparator so that the coincidence circuit 49 will block any pulses on the lead 47 from passing therethrough. With the coincidence circuit 48 energized at its second input, pulses from the pulse generator received on the output line 45 will be passed through the coincidence circuit 48 to the clockwise input terminal 11 of the controller 10. The stepper motor will therefore be sequentially stepped in a clockwise direction. This action will be mechanically communicated through the dash line 57 representing the shaft to the tap 54 of the reference voltage and will serve to move this tap in an upward direction to increase the reference voltage. When the reference voltage equals the analog input voltage, the signals on the line 50 to the coincidence circuit 48 will cease so that no further pulses will be passed to the controller of the stepper motor.

Since the reference voltage tap 54 is moved up a discrete amount to increase the voltage by a given incremental amount for each step of the motor, the actual number of pulses applied to the motor constitutes a function of the change in the reference voltage and thereby constitutes a function of the magnitude of the input analog voltage. The number of pulses will be counted by the counter 60 through the lead 58. The pulses themselves may be taken from the output 61 as a digital information signal indicating the initial difference between the reference voltage and analog input voltage.

If the analog input voltage should now decrease to a value below the reference voltage, a difference voltage of opposite polarity will be provided which is passed on the line 51 to the coincidence circuit 49 thereby enabling counterclockwise pulses to be received in the controller 10; clockwise pulses are blocked by the circuit 48. The counterclockwise pulses will then step the stepper motor in an opposite direction to lower the tap 54 until the voltages are again equal. The number of pulses necessary to equalize the voltages will be a function of the change in the analog voltage.

Since a count of the number of pulses applied to the stepper motor consitutes digital information concerning the analog voltage, it is of the utmost importance that the motor be stepped for each and every pulse received by the motor. It is for this reason that the step detector circuit described is of the utmost importance in insuring that an actual physical stepping of the rotor takes place for each and every input pulse. Because of the enabling circuit 43 in conjunction with the pulse generator 44, it will be clear that the number of pulses applied to the coincidence circuits 48 or 49 and thus to the inputs of the controller 10, correspond exactly to the actual physical number of steps effected by the rotor of the stepper motor.

If the pulse generator should provide pulses at an excessive rate, the enabling circuit 43 will function to inhibit any pulse that is received before the rotor has an opportunity to effect its physical stepping. Thus, the motor may very easily be made to operate at its maximum speed without missing a step.

From the foregoing description, it will thus be evident that the present invention has provided a greatly improved and more reliable stepper motor circuit than has been available heretofore. While the step detector portion for indicating the physical position of the rotor has been described as a rotating disk and photo electric cells, it will be evident to those skilled in the art that equivalent detecting means may be incorporated for providing a signal corresponding to a step position of the rotor. Further, while the invention has been described in conjunction with a simple analog to digital converter, it is evident that it may be incorporated in a digital to analog conversion circuit or in any number of other applications in which a stepper motor is to be used.

Also, the principles of the step detector are applicable to stepper motors having variable reluctance type rotors, the number of photo-cells and holes in the rotating disc of the step detecting means being suitably adjusted for the manner in which the stator field windings are energized.

The invention accordingly is not to be thought of as limited to the specific examples set forth.

What is claimed is:

1. A stepper motor and step detector comprising, in combination: magnetic field generating coils positioned to establish a magnetic field in given selected directions depending upon which coils are energized; a rotor responsive to said magnetic field to align itself in the direction in which said magentic field is established; a control means having outputs connected to said coils such that signals on selected ones of said outputs energize selected ones of said coils, said control means having a pulse input terminal and being responsive to successive pulses received on said terminal to step said magnetic field through discrete angles and thereby successively step said rotor through said discrete angles; a step detector including means coupled to said rotor and responsive to stepping of said rotor from a given position to its next successive position to provide a signal; coincidence circuit means connected to receive said signal and connected to said outputs of said control means, said coincidence circuit means being responsive only to a coincidence of said signal and a signal on one of said outputs to said coils to step said magnetic field to said next successive position to provide a given signal; and enabling means connected to receive said given signal and enable a next successive pulse to be received at said pulse input of said control means, said enabling means blocking pulses to said input in the absence of said given signal, whereby said magnetic field cannot be stepped to a next successive position until such time as said rotor has been stepped to said position in alignment therewith.

2. A stepper motor and step detector comprising, in combination: magnetic field generating means for establishing a magnetic field in given selected directions; a rotor responsive to the magnetic field established in any selected one of said directions by said generating means to align itself in said direction; a control means having outputs connected to said magnetic field generating means and having a clockwise pulse input terminal and a counterclockwise pulse input terminal, said control means energizing said magnetic field generating means to step the direction of said field through a discrete angle in a clockwise circumferential direction in response to each clockwise pulse received and to step the direction of said field through said discrete angle in a counterclockwise circumferential direction in response to each counterclockwise pulse received; a step detector including a plurality of detecting means physically spaced circumferentially about the axis of said rotor at said discrete angles so that there is provided a detecting means corresponding to each step position effected by said rotor in response to stepping of said magnetic field; a pulse generating means; and an enabling means connected to said pulse generating means for passing pulses to said control means only in response to a given signal, said detecting means being connected to said enabling means for providing said given signal only when said rotor is physically stepped to a position juxtaposed to the detecting means corresponding to said stepped position as a consequence of the immediately preceding pulse passed by said enabling means, whereby in each instance a successive pulse to be passed to said control means is blocked until said rotor has achieved its new physical position in response to a previous pulse.

3. A stepper motor and step detector according to claim 2, in which said detecting means include a plurality of photo-electric responsive devices; a plurality of coincidence circuits having their inputs connected to said devices and the outputs of said control means and having their outputs connected to said enabling means; a light source; a shutter means coupled to said rotor for rotation therewith in a position between said light source and said devices, said shutter means having opening means in alignment with said rotor so that only that photo electric device corresponding to a stepped position of said rotor is energized by said light source to pass a signal to its connected coincidence circuit, each coincidence circuit only providing said given signal at its output when it receives signals simultaneously at its inputs.

References Cited

UNITED STATES PATENTS

| | | | |
|---|---|---|---|
| 1,957,240 | 5/1934 | Young | 318—31 X |
| 3,042,847 | 7/1962 | Welch | 310—49 X |
| 3,096,467 | 7/1963 | Angus et al. | 318—138 |
| 3,098,186 | 7/1963 | Williamson et al. | 318—20.605 |
| 3,204,165 | 8/1965 | Kreutzer | 318—138 |
| 3,217,170 | 11/1965 | Bin Lun Ho | 318—28 |
| 3,304,480 | 2/1967 | Ko | 318—138 X |

ORIS L. RADER, *Primary Examiner.*

G. SIMMONS, *Assistant Examiner.*